US012752367B2

(12) United States Patent
Liu

(10) Patent No.: US 12,752,367 B2
(45) Date of Patent: Oct. 6, 2026

(54) PRESSING DEVICE FOR FIXING WORKPIECE ONTO WORKTABLE

(71) Applicant: ABB SCHWEIZ AG, Baden (CH)

(72) Inventor: Yongping Liu, Shanghai (CN)

(73) Assignee: ABB Schweiz AG, Baden (CH)

( * ) Notice: Subject to any disclaimer, the term of this patent is extended or adjusted under 35 U.S.C. 154(b) by 324 days.

(21) Appl. No.: 18/578,461

(22) PCT Filed: Sep. 17, 2021

(86) PCT No.: PCT/CN2021/118998
§ 371 (c)(1),
(2) Date: Jan. 11, 2024

(87) PCT Pub. No.: WO2023/039819
PCT Pub. Date: Mar. 23, 2023

(65) Prior Publication Data

US 2024/0293890 A1 Sep. 5, 2024

(51) Int. Cl.
*B23K 37/04* (2006.01)
*B23K 20/12* (2006.01)

(52) U.S. Cl.
CPC ........ *B23K 20/126* (2013.01); *B23K 37/0408* (2013.01)

(58) Field of Classification Search
CPC ......... B25B 11/02; B25B 5/006; B25B 5/064; B23Q 3/069; B23K 37/04–0443; B23K 20/126
See application file for complete search history.

(56) References Cited

U.S. PATENT DOCUMENTS

| | | | | |
|---|---|---|---|---|
| 5,183,284 A | | 2/1993 | Paplinski | |
| 5,263,632 A | * | 11/1993 | Zadrick | B23K 3/087 228/49.1 |
| 6,360,937 B1 | * | 3/2002 | De Koning | B23K 20/1235 228/2.1 |
| 7,377,503 B2 | * | 5/2008 | Yajima | B23K 37/0443 29/281.1 |
| 10,493,571 B1 | * | 12/2019 | Kostecki | B23K 37/047 |
| 2005/0045693 A1 | * | 3/2005 | Buchheit | B23K 37/0408 228/112.1 |

(Continued)

FOREIGN PATENT DOCUMENTS

| | | | | |
|---|---|---|---|---|
| CN | 103737232 A | * | 4/2014 | B23K 37/0435 |
| CN | 204029942 U | | 12/2014 | |

(Continued)

*Primary Examiner* — Keith Walker
*Assistant Examiner* — Carlos J Gamino
(74) *Attorney, Agent, or Firm* — Whitmyer IP Group LLC

(57) ABSTRACT

A control circuit for use with a network and a distributed control system. The control circuit incudes a switch module, a communication interface module coupled to the switch module and configured to convert data sampled from industrial field into a format suitable for being transmitted to the switch module via the network, and a controller module coupled to the switch module and configured to receive the converted data from the switch module and process the converted data. The switch module is configured to enable a communication between the communication interface module and external devices outside the control circuit and a communication between the controller module and the external devices.

10 Claims, 5 Drawing Sheets

(56) References Cited

U.S. PATENT DOCUMENTS

| | | | | |
|---|---|---|---|---|
| 2007/0039154 | A1* | 2/2007 | Gendou | B23K 20/128 29/709 |
| 2011/0036901 | A1* | 2/2011 | Behrens | B23K 37/0408 228/13 |
| 2013/0221591 | A1* | 8/2013 | Porco | B23K 37/0435 269/37 |
| 2025/0276413 | A1* | 9/2025 | Wang | B23K 37/0408 |
| 2025/0289083 | A1* | 9/2025 | Geneve | B23K 37/0435 |

FOREIGN PATENT DOCUMENTS

| | | | | | |
|---|---|---|---|---|---|
| CN | 204954390 | U | | 1/2016 | |
| CN | 106553014 | A | | 4/2017 | |
| CN | 107717526 | A | | 2/2018 | |
| CN | 108942051 | A | * | 12/2018 | B23K 37/0408 |
| CN | 208276427 | U | | 1/2019 | |
| CN | 209312939 | U | | 8/2019 | |
| CN | 110977136 | A | * | 4/2020 | B23K 20/126 |
| CN | 210360385 | U | | 4/2020 | |
| CN | 211331780 | U | | 8/2020 | |
| CN | 113714719 | A | * | 11/2021 | B23K 37/0443 |
| DE | 102010025521 | B4 | | 11/2024 | |
| EP | 2612726 | A2 | | 10/2014 | |
| KR | 100837685 | B1 | * | 6/2008 | B23K 37/0443 |
| KR | 20130001348 | U | * | 2/2013 | B63B 73/43 |

* cited by examiner

PRESSING DEVICE FOR FIXING WORKPIECE ONTO WORKTABLE

CROSS-REFERENCE TO RELATED APPLICATIONS

This is a national stage application claiming priority to international patent application Serial No.: PCT/CN2021/118998, filed on Sep. 17, 2021; which is herein incorporated by reference in its entirety.

FIELD

Example embodiments of the present disclosure generally relate to the field of workpiece fixing, and more specifically, to a pressing device for fixing a workpiece onto a worktable.

BACKGROUND

Battery trays of new energy vehicles are used to install power batteries. From the perspective of product safety, the power batteries are not allowed to come into contact with moisture, dust and so on. Currently, the battery trays of the new energy vehicles are usually welded by a friction stir welding process to meet the requirements of high standard and stable sealing. In order to weld several workpieces of a battery tray together, the workpieces need be fixed onto a worktable before the welding.

A conventional manner of fixing the workpieces onto the worktable is to use a hydraulic lever cylinder to press the perimeter of the battery tray, i.e., an outermost edge of the workpieces of the battery tray. Such a workpiece fixing manner is relatively simple. However, since only the perimeter of the battery tray is pressed, deformation of the middle part of the battery tray is hard to be controlled. A surface profile tolerance of the battery tray achieved by welding in such a workpiece fixing manner can only reach about 8 mm, which is far beyond a desired surface profile tolerance of 3 mm. Therefore, such a workpiece fixing manner is not suitable for fixing the workpieces of the battery tray during the friction stir welding.

Another conventional manner of fixing the workpieces onto the worktable during the friction stir welding is to use a whole plate with several strip-shaped holes to press the workpieces of the battery tray. The whole plate may turn over to cover both the perimeter and the middle part of the battery tray. Each of the strip-shaped holes exposes a welding seam between adjacent workpieces such that the friction stir welding may be performed at the welding seam. Such a workpiece fixing manner has the following disadvantages. Firstly, the pressing mechanism is so heavy that the turning over of the pressing mechanism will take a long time, affecting the production cycle and reducing the production efficiency. Secondly, since the whole plate is a rigid body and each workpiece of the battery tray has a thickness tolerance, some workpieces of the battery tray can be tightly pressed by the whole plate, but some other workpieces of the battery tray may not be tightly pressed by the whole plate, such that the force applied onto the workpieces by the whole plate is non-uniform. Finally, in order to deal with the deformation of the workpieces after the welding, it is necessary to reverse the deformation of the workpieces when the workpieces are clamped. That is, the workpieces after the clamping would have a small arc, so that each welding seam is required to have a different pressing displacement. However, the whole plate cannot adjust the displacement of each workpiece.

Thus, there is a need for an improved solution for fixing the workpieces onto the worktable.

SUMMARY

In view of the foregoing problems, example embodiments of the present disclosure propose a pressing device for fixing a workpiece onto a worktable.

In an aspect of the present disclosure, example embodiments provide a pressing device for fixing a workpiece onto a worktable, comprising: a supporting member extending in a first direction and comprising first and second ends opposite to each other in the first direction and first and second sides opposite to each other in a second direction normal to the first direction: a pressing arm connected to the first end of the supporting member and being capable of rotating between a closed state and an opened state with respect to the supporting member, wherein a space for receiving the workpiece is formed between the pressing arm and the supporting member when the pressing arm is in the closed state: a first driving assembly arranged on the first side of the supporting member and configured to drive the pressing arm to rotate between the closed state and the opened state with respect to the supporting member: a locking assembly arranged on the first side of the supporting member near to the second end of the supporting member and configured to lock the pressing arm when the pressing arm is in the closed state; and a second driving assembly coupled to the second side of the supporting member and configured to drive the supporting member to move in the second direction.

According to embodiments of the present disclosure, the pressing device may provide long-distance compression for the workpiece on the worktable. Moreover, the force applied onto the workpiece may be uniformly distributed, such that the compression is stable. Further, the pressing device has a compact structure, reducing the occupied space.

In some embodiments, the supporting member comprises: an elongated supporting plate extending in the first direction; and a first connecting member coupled to the elongated supporting plate at the first end of the supporting member. With these embodiments, the elongated supporting plate and the first connecting member may be fabricated separately and then assembled together with each other. In this way, the supporting member is easy to be manufactured, reducing the manufacture cost of the supporting member.

In some embodiments, the pressing arm comprises: a first arm coupled to the first end of the supporting member via a first rotating shaft; and a second arm coupled to the first arm and extending in the first direction when the pressing arm is in the closed state, the second arm comprising a third side facing the first side of the supporting member and a fourth side opposite to the third side. With these embodiments, the space for receiving the workpiece may be stably formed between the second arm and the supporting member.

In some embodiments, the pressing arm further comprises: a plurality of pressing blocks arranged on the third side of the second arm and configured to press the workpiece onto the worktable. With these embodiments, the pressing blocks may apply uniform pressure onto the workpiece, such that the workpiece may be fixed stably.

In some embodiments, the pressing arm further comprises: a plurality of gaskets each arranged between the third side of the second arm and the respective pressing block. With these embodiments, the gaskets may adjust the height of the pressing blocks protruding from the second arm so as to eliminate the thickness tolerance between different workpieces. In this way; each workpiece may be pressed firmly.

In some embodiments, the pressing arm further comprises a first positioning member arranged on the third side of the second arm, and the pressing device further comprises a second positioning member arranged on the first side of the supporting member near to the second end of the supporting member and configured to support the first positioning member when the pressing arm is in the closed state. With these embodiments, the second positioning member may stably support the first positioning member when the pressing arm is in the closed state. In this way, when the pressing arm is locked by the locking assembly, the space for receiving the workpiece may have a stable shape.

In some embodiments, the pressing device further comprises: a buffering member arranged on the second positioning member and configured to buffer the second arm when the pressing arm is switched from the opened state to the closed state. With these embodiments, when the pressing arm is switched from the opened state to the closed state, the buffering member may apply a buffering force to the pressing arm, reducing the impact of the pressing arm on the second positioning member.

In some embodiments, the first driving assembly comprises: a mounting base arranged on the first side of the supporting member: a first driving member arranged on the mounting base via a second rotating shaft and comprising a driving shaft capable of switching between an extended state and a retracted state, wherein the pressing arm is in the closed state when the driving shaft is in the retracted state, and the pressing arm is in the opened state when the driving shaft is in the extended state; and a second connecting member arranged on the driving shaft and coupled to the pressing arm via a third rotating shaft. With these embodiments, the first driving member may drive the pressing arm to precisely and reliably rotate between the closed state and the opened state.

In some embodiments, the second driving assembly comprises: a second driving member coupled to the second side of the supporting member and configured to move the supporting member: a guiding shaft coupled to the second side of the supporting member; and a bush surrounding the guiding shaft. With these embodiments, the second driving member may drive the supporting member to move. Meanwhile, the guiding shaft and the bush may ensure that the supporting member moves in the second direction.

In some embodiments, the locking assembly comprises: a third driving member arranged on the first side of the supporting member near to the second end of the supporting member; and a locking member configured to be driven by the third driving member to lock the pressing arm when the pressing arm is in the closed state. With these embodiments, the third driving member may drive the locking member to reliably lock the pressing arm when the pressing arm is in the closed state.

DESCRIPTION OF DRAWINGS

Drawings described herein are provided to further explain the present disclosure and constitute a part of the present disclosure. The example embodiments of the disclosure and the explanation thereof are used to explain the present disclosure, rather than to limit the present disclosure improperly.

Throughout the drawings, the same or similar reference symbols are used to indicate the same or similar elements.

DETAILED DESCRIPTION OF EMBODIMENTS

Figure 1:
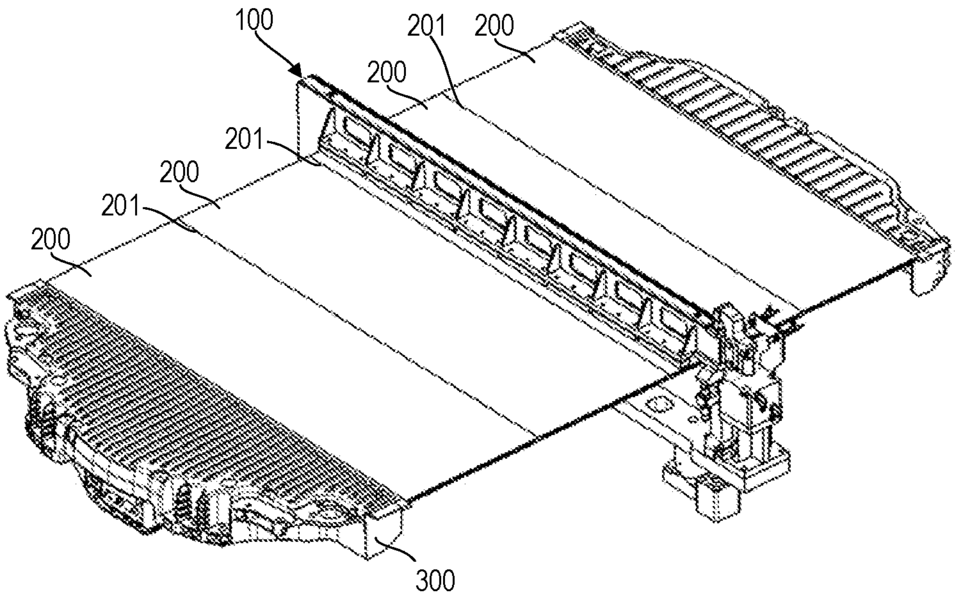
FIG. 1 illustrates a relative arrangement between a pressing device and workpieces to be processed in accordance with an embodiment of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below: A definition of a term is consistent throughout the description unless the context clearly indicates otherwise.

As described above, the conventional manners of fixing the workpieces onto the worktable have various problems. For example, when the hydraulic lever cylinder is used to press the perimeter of the battery tray, the deformation of the middle part of the battery tray is hard to be controlled. Moreover, when the whole plate with the strip-shaped holes is used to press the workpieces of the battery tray; some workpieces of the battery tray can be tightly pressed by the whole plate, but some other workpieces of the battery tray may not be tightly pressed by the whole plate, such that the force applied onto the workpieces by the whole plate is non-uniform.

According to embodiments of the present disclosure, in order to overcome the typical shortcomings of the conventional solution of fixing the workpieces onto the worktable, a pressing device comprising a supporting member, a pressing arm, a first driving assembly, a locking assembly, and a second driving assembly is provided for fixing the workpiece onto the worktable. The above idea may be implemented in various manners, as will be described in detail in the following paragraphs.

Figure 2:
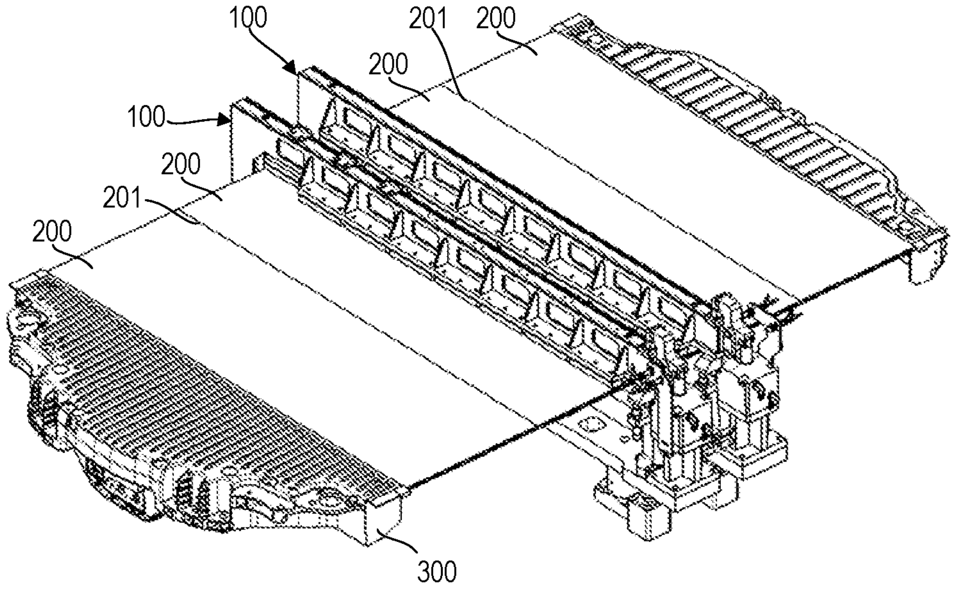
FIG. 2 illustrates a relative arrangement between two pressing devices and the workpieces to be processed in accordance with an embodiment of the present disclosure.

Hereinafter, the principles of the present disclosure will be described in detail with reference to FIGS. 1-5. Referring to FIGS. 1-2 first, FIG. 1 illustrates a relative arrangement between a pressing device 100 and workpieces 200 to be processed in accordance with an embodiment of the present disclosure, FIG. 2 illustrates a relative arrangement between two pressing devices 100 and the workpieces 200 to be processed in accordance with an embodiment of the present disclosure. As shown in FIGS. 1 and 2, several workpieces 200 (for example, two, three, four, or more) are arranged on a worktable 300 so as to be processed in a subsequent procedure.

In some embodiments, the workpieces 200 may be used to constitute a battery tray of a new energy vehicle by a friction stir welding process. The workpieces 200 are arranged side by side on the worktable 300, such that welding seams 201 are formed between the adjacent workpieces 200. The pressing device 100 is arranged around a first workpiece among the workpieces 200 and near to one of the welding seams 201, so as to fix the first workpiece onto the worktable 300 when the pressing device 100 moves downwards.

As shown in FIG. 2, for each welding seam 201, two pressing devices 100 may be provided near to the welding seam 201, so as to press the respective workpieces 200. FIG. 2 only illustrates the pressing devices 100 corresponding to one of the welding seams 201. For each of the other welding seams 201, two pressing devices 100 may be provided in the similar manner.

It is to be understood that, in other embodiments, the workpieces 200 may be fixed onto the worktable 300 for other processing, instead of the friction stir welding process. The scope of the present disclosure is not intended to be limited in this respect.

Hereinafter, example structures and operating principles of the pressing device 100 will be described in detail with reference to FIGS. 3-5.

Figure 3:
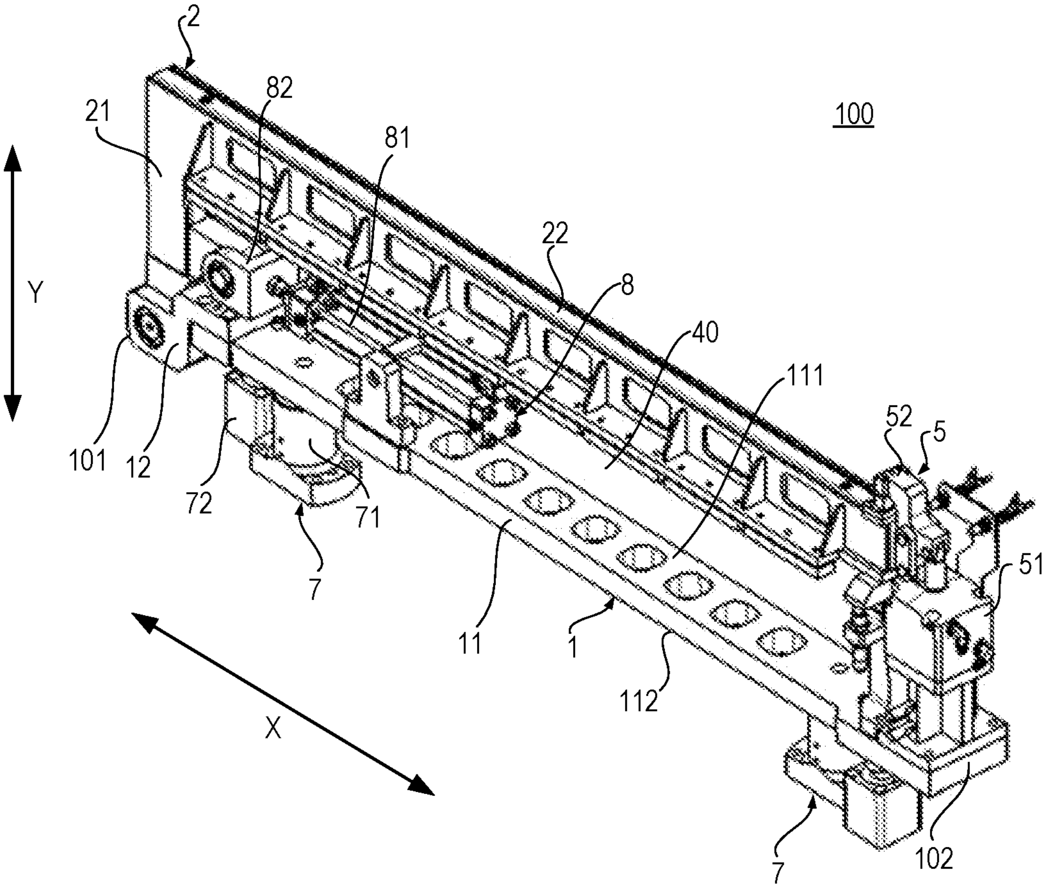
FIG. 3 illustrates a perspective view of the pressing device in accordance with an embodiment of the present disclosure.

FIG. 3 illustrates a perspective view of the pressing device 100 in accordance with an embodiment of the present disclosure. As shown in FIG. 3, the pressing device 100 described herein generally includes a supporting member 1, a pressing arm 2, a first driving assembly 8, a locking assembly 5, and a second driving assembly 7.

The supporting member 1 extends substantially in a first direction X, e.g., a horizontal direction. The supporting member 1 is of an elongated shape. The supporting member 1 includes first and second ends 101, 102 opposite to each other in the first direction X and first and second sides 111, 112 opposite to each other in a second direction Y normal to the first direction X. The supporting member 1 may be used to support other parts of the pressing device 100.

The pressing arm 2 is connected to the first end 101 of the supporting member 1. The pressing arm 2 is capable of rotating between a closed state and an opened state with respect to the supporting member 1. In FIG. 3, the pressing arm 2 is illustrated as being in the closed state. The opened state of the pressing arm 2 is illustrated in FIG. 5, which will be described in detail in the following paragraphs.

As shown in FIG. 3, when the pressing arm 2 is in the closed state, a space 40 for receiving the workpiece 200 is formed between the pressing arm 2 and the supporting member 1. In this way, the pressing device 100 may be arranged around the workpiece 200 so as to press the workpiece 200 downwards and thus fix the workpiece 200 onto the worktable 300, as shown in FIG. 1.

In order to drive the pressing arm 2 to rotate with respect to the supporting member 1, the first driving assembly 8 is arranged on the first side 111 of the supporting member 1 to push or pull the pressing arm 2. In this way, the first driving assembly 8 may drive the pressing arm 2 to rotate between the closed state and the opened state with respect to the supporting member 1.

As shown in FIG. 3, the locking assembly 5 is arranged on the first side 111 of the supporting member 1 near to the second end 102 of the supporting member 1. The locking assembly 5 is configured to lock the pressing arm 2 when the pressing arm 2 is in the closed state. When the pressing arm 2 is locked by the locking assembly 5, the pressing arm 2 will be unable to rotate with respect to the supporting member 1.

The second driving assembly 7 is coupled to the second side 112 of the supporting member 1 and configured to drive the supporting member 1 to move in the second direction Y. As shown in FIGS. 1 and 3, when the second driving assembly 7 drives the supporting member 1 to move downwards in the second direction Y, the pressing arm 2 may press the workpiece 200 downwards and thus fix the workpiece 200 onto the worktable 300. In contrast, when the second driving assembly 7 drives the supporting member 1 to move upwards in the second direction Y, the pressing arm 2 may release the workpiece 200.

Since the supporting member 1 and the pressing arm 2 extend in the first direction X, the pressing device 100 may provide long-distance compression for the workpiece 200 on the worktable 300. Moreover, the force applied onto the workpiece 200 may be uniformly distributed, such that the compression is stable. Further, the pressing device 100 has a compact structure, reducing the occupied space.

Figure 4:
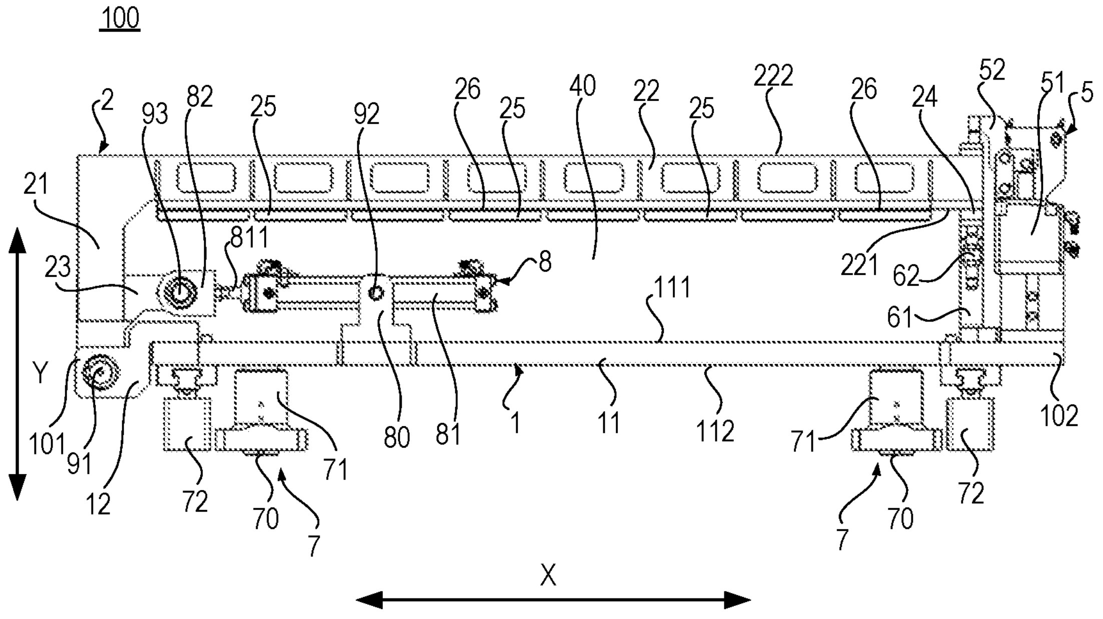
FIG. 4 illustrates a front view of the pressing device in accordance with an embodiment of the present disclosure, in which the pressing arm is in a closed state.

FIG. 4 illustrates a front view of the pressing device 100 in accordance with an embodiment of the present disclosure, in which the pressing arm 2 is in the closed state. FIG. 5 illustrates a front view of the pressing device 100 in accordance with an embodiment of the present disclosure, in which the pressing arm 2 is in the opened state.

Figure 5:
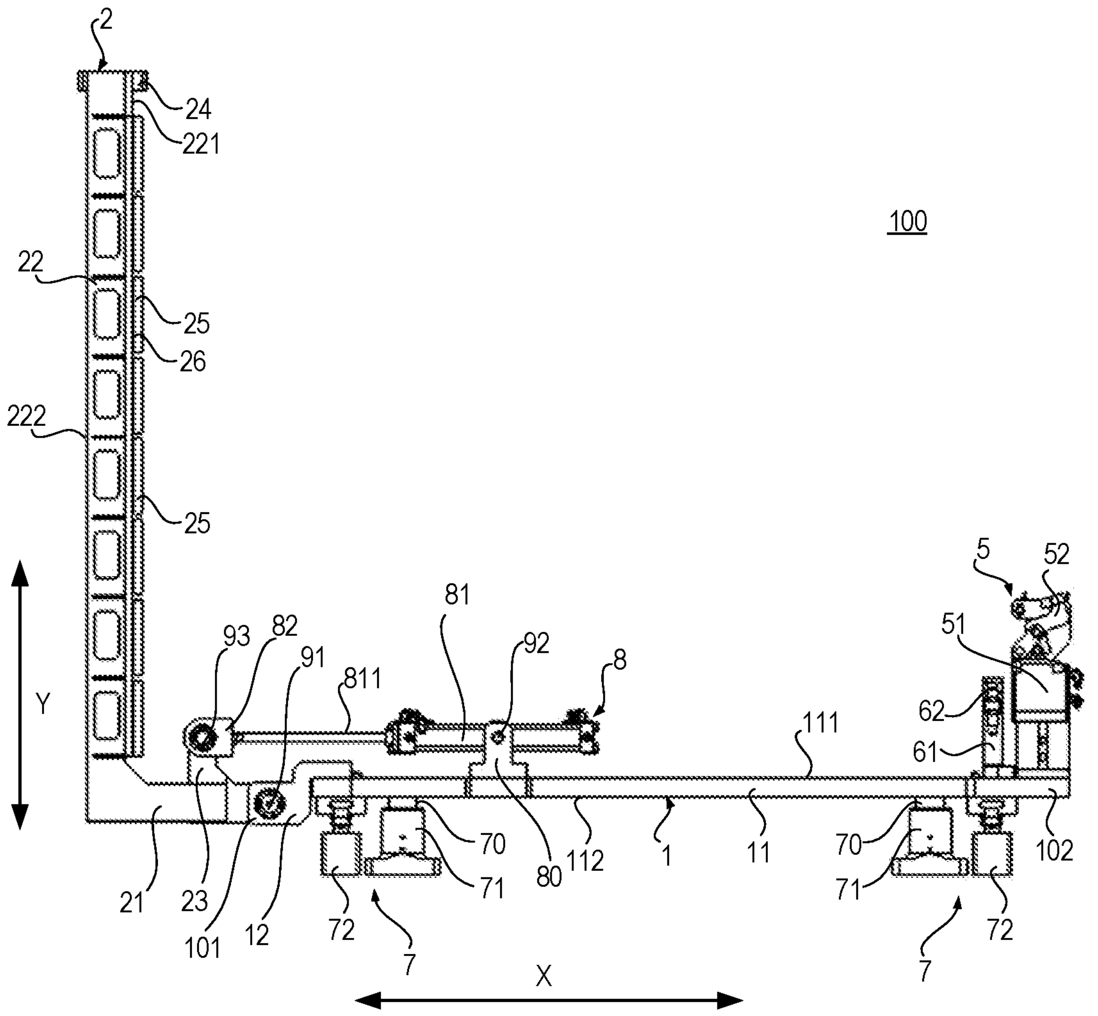
FIG. 5 illustrates a front view of the pressing device in accordance with an embodiment of the present disclosure, in which the pressing arm is in an opened state.

In some embodiments, as shown in FIGS. 3-5, the supporting member 1 includes an elongated supporting plate 11 and a first connecting member 12. The elongated supporting plate 11 extends substantially in the first direction X. The first connecting member 12 is coupled to the elongated supporting plate 11 at the first end 101 of the supporting member 1. With these embodiments, the elongated supporting plate 11 and the first connecting member 12 may be fabricated separately and then assembled together with each other. In this way, the supporting member 1 is easy to be manufactured, reducing the manufacture cost of the supporting member 1.

It is to be understood that, in other embodiments, the supporting member 1 may be formed integrally or have other structures, as long as the supporting member 1 extends substantially in the first direction. The scope of the present disclosure is not intended to be limited in this respect.

In some embodiments, as shown in FIGS. 3-5, the pressing arm 2 includes a first arm 21 and a second arm 22. The first arm 21 is coupled to the first end 101 of the supporting member 1 via a first rotating shaft 91. The second arm 22 is coupled to the first arm 21. The first arm 21 and the second arm 22 may be formed integrally or assembled together in various manners.

As shown in FIGS. 3 and 4, the second arm 22 extends substantially in the first direction X when the pressing arm 2 is in the closed state. The second arm 22 includes a third side 221 facing the first side 111 of the supporting member 1 and a fourth side 222 opposite to the third side 221.

As shown in FIG. 5, the second arm 22 extends substantially in the second direction Y when the pressing arm 2 is in the opened state. It is to be understood that, in other embodiments, the second arm 22 may extend in a direction different from the second direction Y when the pressing arm 2 is in the opened state. For example, the second arm 22 may extend obliquely when the pressing arm 2 is in the opened state.

In some embodiments, as shown in FIGS. 4 and 5, the pressing arm 2 further includes a plurality of pressing blocks 25 arranged on the third side 221 of the second arm 22. The pressing blocks 25 are arranged side by side on the second arm 22 to press different positions of the workpiece 200 when the pressing arm 2 is in the closed state. With these embodiments, the pressing blocks 25 may apply uniform pressure onto the workpiece 200, such that the workpiece 200 may be fixed stably.

In some embodiments, as shown in FIGS. 4 and 5, the pressing arm 2 further includes a plurality of gaskets 26. Each of the gaskets 26 is arranged between the third side 221 of the second arm 22 and the respective pressing block 25. The height of each of the gaskets 26 is adjustable, such that the height of the pressing blocks 25 protruding from the second arm 22 may be adjusted according to the thickness of the workpiece 200. In this way, the thickness tolerance between different workpieces 200 may be eliminated, such that the workpieces 200 may be pressed firmly. Moreover, with such an arrangement, the deformation of the workpieces 200 after the welding may be controlled effectively.

In some embodiments, as shown in FIGS. 4 and 5, the pressing arm 2 further includes a first positioning member 24 arranged on the third side 221 of the second arm 22. The pressing device 100 further includes a second positioning member 61 arranged on the first side 111 of the supporting member 1 near to the second end 102 of the supporting member 1. The second positioning member 61 is configured to support the first positioning member 24 when the pressing arm 2 is in the closed state. In other words, when the pressing arm 2 is in the closed state, the second positioning member 61 is aligned with the first positioning member 24 and in contact with the first positioning member 24 so as to support the first positioning member 24 and thus support the pressing arm 2. When the pressing arm 2 is locked by the locking assembly 5, the space 40 for receiving the workpiece 200 may have a stable shape.

In some embodiments, as shown in FIGS. 4 and 5, the pressing device 100 further includes a buffering member 62 arranged on the second positioning member 61. The buffering member 62 is configured to buffer the second arm 22 when the pressing arm 2 is switched from the opened state to the closed state. The buffering member 62 may include a spring or other types of buffering components. With these embodiments, when the pressing arm 2 is switched from the opened state to the closed state, the buffering member 62 may apply a buffering force to the pressing arm 2, reducing the impact of the pressing arm 2 on the second positioning member 61.

In some embodiments, as shown in FIGS. 4 and 5, the first driving assembly 8 includes a mounting base 80, a first driving member 81, and a second connecting member 82. The mounting base 80 is arranged on the first side 111 of the supporting member 1. The first driving member 81 is arranged on the mounting base 80 via a second rotating shaft 92 and includes a driving shaft 811 capable of switching between an extended state and a retracted state. As shown in FIG. 4, the pressing arm 2 is in the closed state when the driving shaft 811 is in the retracted state. As shown in FIG. 5, the pressing arm 2 is in the opened state when the driving shaft 811 is in the extended state. When the pressing arm 2 rotates between the closed state and the opened state, the first driving member 81 may rotate about the second rotating shaft 92 with respect to the mounting base 80. The second connecting member 82 is arranged on the driving shaft 811 and coupled to a third connecting member 23 of the pressing arm 2 via a third rotating shaft 93. When the pressing arm 2 rotates between the closed state and the opened state, the first driving member 81 may rotate with respect to the mounting base 80. With these embodiments, the first driving member 81 may drive the pressing arm 2 to precisely and reliably rotate between the closed state and the opened state.

In some embodiments, the first driving member 81 includes an oil cylinder. In other embodiments, the first driving member 81 may include other types of driving devices, such as a pneumatic motor. The scope of the present disclosure is not intended to be limited in this respect.

It is to be understood that, in other embodiments, the first driving assembly 8 may have other structures, as long as the first driving assembly 8 may drive the pressing arm 2 to rotate with respect to the supporting member 1.

In some embodiments, as shown in FIGS. 4 and 5, the second driving assembly 7 includes a second driving member 72, a guiding shaft 70, and a bush 71. The second driving member 72 is coupled to the second side 112 of the supporting member 1 and configured to drive the supporting member 1 to move. The guiding shaft 70 is coupled to the second side 112 of the supporting member 1. The bush 71 surrounds the guiding shaft 70. The guiding shaft 70 may move with respect to the bush 71 in the second direction Y. The bush 71 may be supported by a bracket (not shown). With these embodiments, the second driving member 72 may drive the supporting member 1 to move. Meanwhile, the guiding shaft 70 and the bush 71 may ensure that the supporting member 1 moves in the second direction Y.

In some embodiments, the second driving member 72 includes an oil cylinder, such as a thin oil cylinder. In other embodiments, the second driving member 72 may include other types of driving devices, such as a pneumatic motor. The scope of the present disclosure is not intended to be limited in this respect.

In some embodiments, as shown in FIGS. 4 and 5, the second driving assembly 7 may include two sets of second driving members 72, guiding shafts 70, and bushes 71. The first set of second driving member 72, guiding shaft 70, and bush 71 is arranged near to the first end 101 of the supporting member 1. The second set of second driving member 72, guiding shaft 70, and bush 71 is arranged near to the second end 102 of the supporting member 1. With the two sets of second driving members 72, guiding shafts 70, and bushes 71, the stability and reliability of the movement of the supporting member 1 can be further improved.

It is to be understood that, in other embodiments, the second driving assembly 7 may have other structures, as long as the second driving assembly 7 may drive the supporting member 1 to move in the second direction Y.

In some embodiments, as shown in FIGS. 4 and 5, the locking assembly 5 includes a third driving member 51 and a locking member 52. The third driving member 51 is arranged on the first side 111 of the supporting member 1 near to the second end 102 of the supporting member 1. The locking member 52 is configured to be driven by the third driving member 51 to lock the pressing arm 2 when the pressing arm 2 is in the closed state. With these embodiments, the third driving member 51 may drive the locking member 52 to reliably lock the pressing arm 2 when the pressing arm 2 is in the closed state.

In some embodiments, the third driving member 51 includes an oil cylinder, such as a lever cylinder. In other embodiments, the third driving member 51 may include other types of driving devices, such as a pneumatic motor. The scope of the present disclosure is not intended to be limited in this respect.

It is to be understood that, in other embodiments, the locking assembly 5 may have other structures, as long as the locking assembly 5 may lock the pressing arm 2 when the pressing arm 2 is in the closed state.

Hereinafter, the operation of the pressing device 100 will be described in detail with reference to FIGS. 4 and 5.

As shown in FIG. 4, the driving shaft 811 of the first driving assembly 8 is in the retracted state, such that the pressing arm 2 is in the closed state. At this time, the first positioning member 24 is supported by the second positioning member 61, and the pressing arm 2 is locked by the locking assembly 5. The second driving assembly 7 may drive the supporting member 1 to move downwards, such that the pressing arm 2 presses the workpiece 200 arranged in the space 40. In this way, the workpiece 200 may be fixed onto the worktable 300 for further processing, such as the welding.

In order to release the workpiece 200 after the completion of the processing, the second driving assembly 7 may drive the supporting member 1 to move upwards, such that the pressing arm 2 does not press the workpiece 200. Then, as shown in FIG. 5, the locking assembly 5 unlocks the pressing arm 2, and the driving shaft 811 of the first driving assembly 8 transitions from the retracted state into the extended state, such that the pressing arm 2 is in the opened state. At this time, the workpiece 200 may be taken out from the worktable 300.

The inventors found that a surface profile tolerance of the battery tray achieved by welding in such a workpiece fixing manner can reach about 3 mm, or even smaller. Thus, the pressing device 100 according to embodiments of the present disclosure is suitable for fixing the workpieces of the battery tray during the friction stir welding.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications 10 falling under the scope and boundary of the claims or equivalents of the scope and boundary.

What is claimed is:

1. A pressing device for fixing a workpiece onto a worktable, comprising:
- a supporting member extending in a first direction and comprising first and second ends opposite to each other in the first direction and first and second sides opposite to each other in a second direction normal to the first direction;
- a pressing arm connected to the first end of the supporting member and being capable of rotating between a closed state and an opened state with respect to the supporting member, wherein a space for receiving the workpiece is formed between the pressing arm and the supporting member when the pressing arm is in the closed state;
- a first driving assembly arranged on the first side of the supporting member and configured to drive the pressing arm to rotate between the closed state and the opened state with respect to the supporting member;
- a locking assembly arranged on the first side of the supporting member near to the second end of the supporting member and configured to lock the pressing arm when the pressing arm is in the closed state; and
- a second driving assembly coupled to the second side of the supporting member and configured to drive the supporting member to move in the second direction.

2. The pressing device according to claim 1, wherein the supporting member further comprises:
- an elongated supporting plate extending in the first direction; and
- a first connecting member coupled to the elongated supporting plate at the first end of the supporting member.

3. The pressing device according to claim 1, wherein the pressing arm comprises:
- a first arm coupled to the first end of the supporting member via a first rotating shaft; and
- a second arm coupled to the first arm and extending in the first direction when the pressing arm is in the closed state, the second arm comprising a third side facing the first side of the supporting member and a fourth side opposite to the third side.

4. The pressing device according to claim 3, wherein the pressing arm further comprises:
- a plurality of pressing blocks arranged on the third side of the second arm and configured to press the workpiece onto the worktable.

5. The pressing device according to claim 4, wherein the pressing arm further comprises:
- a plurality of gaskets each arranged between the third side of the second arm and the respective pressing block.

6. The pressing device according to claim 3, wherein the pressing arm further comprises a first positioning member arranged on the third side of the second arm, and
- wherein the pressing device further comprises a second positioning member arranged on the first side of the supporting member near to the second end of the supporting member and configured to support the first positioning member when the pressing arm is in the closed state.

7. The pressing device according to claim 6, further comprising:
- a buffering member arranged on the second positioning member and configured to buffer the second arm when the pressing arm is switched from the opened state to the closed state.

8. The pressing device according to claim 1, wherein the first driving assembly comprises:
- a mounting base arranged on the first side of the supporting member;
- a first driving member arranged on the mounting base via a second rotating shaft and comprising a driving shaft capable of switching between an extended state and a retracted state, wherein the pressing arm is in the closed state when the driving shaft is in the retracted state, and the pressing arm is in the opened state when the driving shaft is in the extended state; and
- a second connecting member arranged on the driving shaft and coupled to the pressing arm via a third rotating shaft.

9. The pressing device according to claim 1, wherein the second driving assembly comprises:
- a second driving member coupled to the second side of the supporting member and configured to move the supporting member;
- a guiding shaft coupled to the second side of the supporting member; and
- a bush surrounding the guiding shaft.

10. The pressing device according to claim 1, wherein the locking assembly comprises:

a third driving member arranged on the first side of the supporting member near to the second end of the supporting member;

wherein the third driving member drives a locking member to lock the pressing arm when the pressing arm is in the closed state.

* * * * *